United States Patent [19]

White

[11] 4,036,352
[45] July 19, 1977

[54] ENDLESS CONVEYOR

[75] Inventor: David Laverne White, Dallastown, Pa.

[73] Assignee: Alto Corporation, Pa.

[21] Appl. No.: 732,469

[22] Filed: Oct. 14, 1976

Related U.S. Application Data

[63] Continuation of Ser. No. 600,493, July 30, 1975, abandoned.

[51] Int. Cl.² .............................................. B65G 15/02
[52] U.S. Cl. ..................................... 198/778; 198/848
[58] Field of Search ................ 198/778, 831, 848, 849

[56] References Cited

U.S. PATENT DOCUMENTS

| | | | |
|---|---|---|---|
| 2,591,987 | 4/1952 | Werden | 198/848 |
| 2,758,391 | 8/1956 | Lanham | 198/778 |
| 2,862,602 | 12/1958 | Greer et al. | 198/848 |
| 3,240,316 | 3/1966 | Huffman | 198/778 |
| 3,536,183 | 10/1970 | Locke | 198/778 |
| 3,659,697 | 5/1972 | Brackmann et al. | 198/778 |
| 3,664,487 | 5/1972 | Ballenger | 198/778 |
| 3,666,083 | 5/1972 | Smith | 198/778 |

Primary Examiner—Evon C. Blunk
Assistant Examiner—Richard K. Thomson
Attorney, Agent, or Firm—Thomas Hooker

[57] ABSTRACT

An endless conveyor and belt where the conveyor belt is made from a plurality of laterally extending rods linked together at the edges of the belt to form a fixed pitch driving chain on one edge of the belt and a variable pitch chain on the other edge of the belt. The driving chain is formed of links extending upstream from rods and surrounding the adjacent upstream rods. The links in the variable pitch chain loosely surround the adjacent rod ends to permit relative movement between the adjacent rods. The rods rest on fixed supports which, during movement of the belt along the path of the conveyor, exert drag forces on the rods tending to rotate the upstream-extending links of the fixed pitch chain against seats on adjacent upstream links, thereby locking the links one to another and supporting the rods against drag forces without column loading. Drive forces are not transmitted across the belt. The ends of the rods at the variable pitch chain float with respect to each other.

1 Claim, 6 Drawing Figures

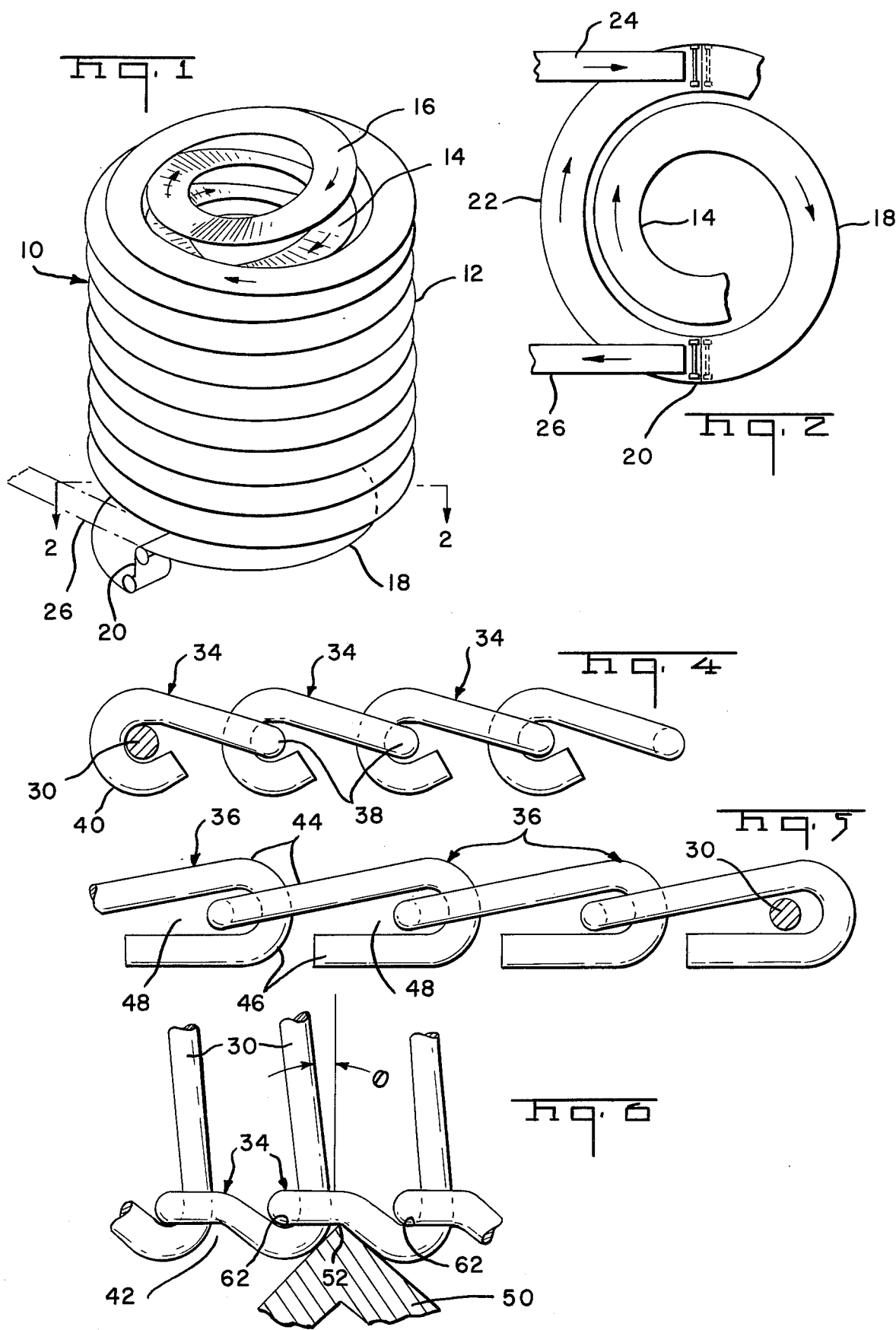

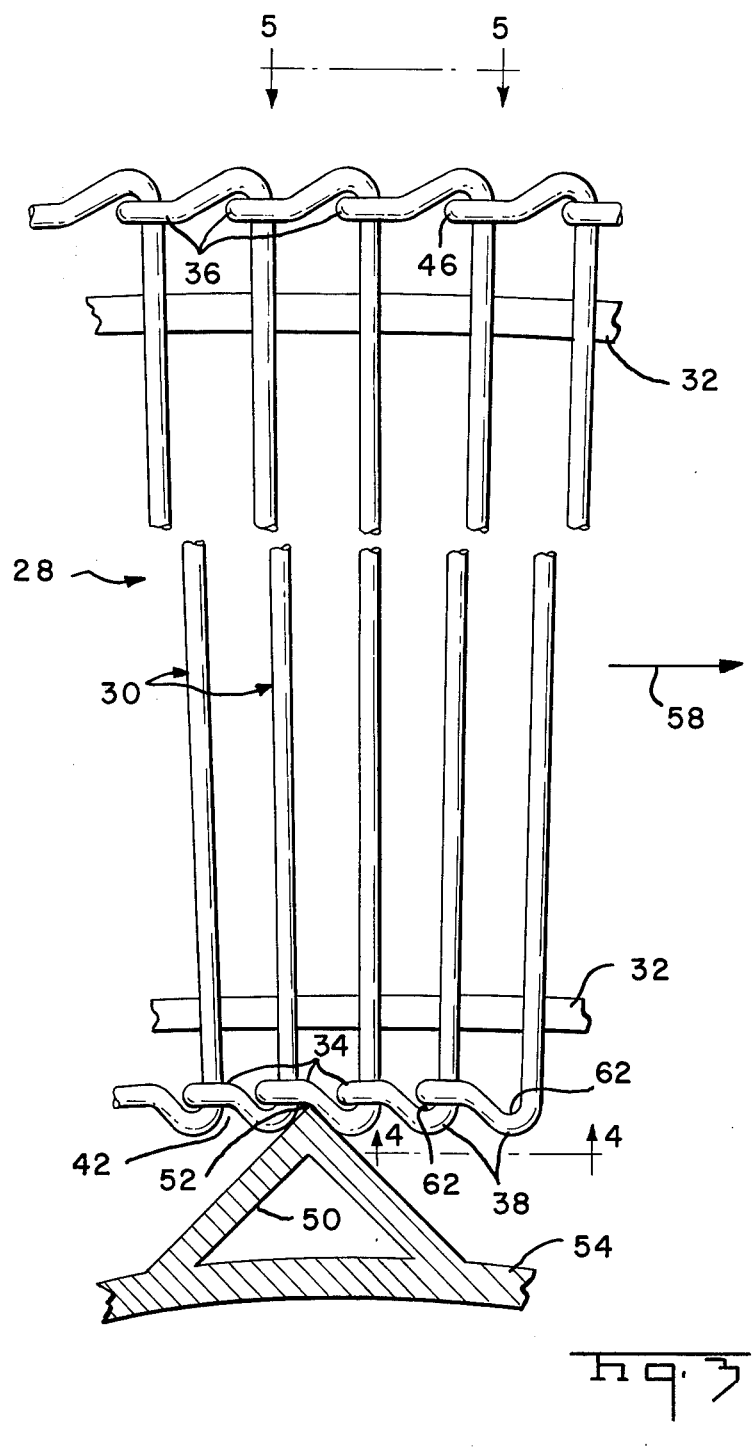

ENDLESS CONVEYOR

This is a continuation of application Ser. No. 600,493, filed July 30, 1975, now abandoned.

The invention relates to endless conveyors and belts for endless conveyors and particularly to improve endless conveyors and belts of the type shown in Ballenger U.S. Pat. No. 3,664,487. This patent discloses a double helical conveyor with a belt having a fixed pitch outer chain and a variable pitch inner chain. Drive members engage spaced links of the inner chain to move the belt along the conveyor path. A number of difficulties have been experienced with this type of conveyor, including uneven belt motion, tiping up of the outer chain of the belt, buckling of conveyor belt rods, and undue belt wear.

These problems are avoided or reduced by the use of an improved belt formed of laterally extending rods with inner and outer link chains, the inner or driven link chain having a fixed pitch maintained by the driving members and by tensioning devices on the conveyor and the pitch of the outer link chain being varible with the outer rod ends floating with respect to each other. The links of the inner link chain extend from each rod upstream and around the next upstream rod so that the frictional drag forces on the rods pivot the upstream-extending links against the links extending upstream from the next upstream rod and in that way lock the links of the driven chain together and secure the rods against collapse. The inner links lock together to form an arcuate configuration extending between the spaced drive members and conforming to the curvature of the conveyor path. The ends of the rods at the outer side of the belt float with respect to each other, thereby permitting movement of the belt around sprockets and along segments of the conveyor path where the curvature of the path varies. The stresses exerted on the rods are reduced since the driving force is transmitted directly to the rods from the fixed links on the driven link chain, in contrast to the prior art where the driving force is transmitted from the driven inner link of the varible pitch inner chain through the length of a rod to the link of the outer fixed pitch chain and along the outer chain to the rods.

Accordingly, an object of the invention is to provide an improved conveyor and belt. Another object is to provide an endless conveyor and belt where the belt is driven smoothly from one side and rod bowing and excessive wear are eliminated, correspondingly increasingly the useful life and reliability of the conveyor and belt.

Other objects and features of the invention will become apparent as the description proceeds, especially when taken in conjunction with the accompanying drawings illustrating the invention, of which there are two sheets.

IN THE DRAWINGS

FIG. 1 is a perspective view of the conveyor belt of an endless helical conveyor;

FIG. 2 is a view taken along line 2—2 of FIG. 1 illustrating the product infeed and outfeed units of the conveyor;

FIG. 3 is a top view of a section of the belting and drive as used in the conveyor;

FIGS. 4 and 5 are views taken along lines 4—4 and 5—5 respectively of FIG. 3 illustrating inner and outer chains of the conveyor belting; and FIG. 6 is a view illustrating the drive and belting when stressed by frictional drag.

FIGS. 1 and 2 are representational of the conveyor path of an endless helical conveyor disclosed more fully in Ballenger U.S. Pat. No. 3,664,487. The Ballenger endless conveyor includes a continuous belt moving along an outer upwardly moving helical conveyor path 12, an inner downwardly moving helcial conveyor path 14 surrounded by path 12, an upper transition portion 16 with the beginning of path 14 and a lower transition portion 18. The first loop of helical path 12 includes a pair of vertical sections 20 and 22 where the conveyor belting passes over pairs of spaced sprocket gears. The sections 20 and 22 provide tension for the conveyor belting. Articles to be carried by conveyor 10 are moved by infeed conveyor 24 located at the step provided by vertical section 22 so that the articles are transferred from conveyor 24 onto the first loop of the outer helical path 12. Articles carried to the bottom of the inner helical path 14 and along the transition portion 18 are carried away from the conveyor 10 by outfeed conveyor 26 located at the step defined by vertical portion 20. The frame, drive mechanism and other structural features of conveyor 10 are disclosed in the Ballenger patent which is incorporated herein by reference.

FIG. 3 illustrates a portion of the endless conveyor belt 28 used in conveyor 10 which traverses the entire double helical path and transition portions illustrated in FIG. 1. Belt 28 includes a number of like rods 30 formed of uniform cross section material, in this case, rod stock extending laterally across the width of the belt and resting on spaced support rails 32 which are attached to the frame of the conveyor. Links 34 are provided on the inner ends of rods 30 and links 36 are provided on the outer ends of the rods. As illustrated in FIG. 4, each link 34 includes an upstream bend portion 38 and a hook portion 40 extending around the end of the adjacent upstream rod 30. The bends 38 extend through an angle greater than 90° so that the hook 40 is located laterally inwardly of the edge of the belt and the bends 38 from adjacent rods cooperate to define drive recesses 42 between adjacent links. The chain formed by the inner links 34 is maintained taut by the conveyor drive and by the tensioning sections 20 and 22 so that the pitch of this side of the belt is fixed. The ends of hooks 40 are bent back toward the links to prevent opening of the chain.

The outer links of belt 28 are illustrated at FIGS. 3 and 5 and each include an upstream extending bend 44 and a hook 46 surrounding the end of the adjacent upstream rod 30. The interior recess 48 of the hook 46 loosely confines the surrounded rod while permitting limited movement of the rods toward and away from each other. In this way, the pitch of the outer chain of links is free to vary as the belt traverses the conveyor path illustrated in FIG. 1. FIG. 5 illustrates the outer chain with a median pitch, the upstream rods extending through the centers of the recesses 48. The free end of each hook 46 is bent back toward the link sufficiently to prevent opening of the chain.

Belt 28 is driven along the conveyor path by a drive illustrated in detail in the Ballenger patent. The drive includes a number of spaced drive angles 50 secured to a movable drive support so that the angles are driven along one side of the helical loops 12 and 14. One such angle 50 is illustrated in FIG. 3 and includes a drive corner 52 extending into a drive recess 42 to engage the bends 38 of the adjacent belt rods. The support 54 carrying corner 50 is driven along the inner side of the conveyor path in the direction of arrow 58 to move the belt along rails 32 in the direction of arrow 58. The inner link chain is maintained in tension with the upstream rods held tightly against hooks 40.

During movement of the belt along the conveyor path, frictional forces between the rods 30 and the supporting rails 32 impart drag forces on the rods which tend to restrain movement of the rods. The drag forces are increased by the weight of articles carried by the conveyor. Because the pitch of the inner chain of links is fixed and the pitch of the outer chain of links is variable, the rods are cantilevered with respect to the inner chain and the drag forces flex or rotate the individual rods upstream through a shallow angle about the connection between the rod and the link 34 on the adjacent downstream rod. Such rotation seats the link 34 of each rod in the recess 62 of the bend 38 on the next upstream rod so that the rods become locked together without excessive column loading as illustrated in FIG. 6. The links 34 are locked together in an arcuate configuration conforming to the curvature of the conveyor path and contribute to smooth movement of the belt along the path.

As the belt passes over the transition portions 16 and 18, the curvature and the path changes and the pitch of the outer chain varies to provide the required foreshortening or lengthening of the outer side of the belt. The rods 30 remain on the support rails 32 and are not excessively stressed while passing over the transition portions.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. An endless conveyor including a closed path for a continuous conveyor belt; a support extending along the path; an endless belt on the path resting on the support and having an inner edge and an outer edge; drive members located at spaced intervals along the inside path for moving the belt downstream along the path; said belt including a number of rods extending laterally across the width of the path and resting upon the support, integral links at the ends of the rods defining an inner chain of links and an outer chain of links, each link of the outer chain extending from its respective rod along the path and around an adjacent rod, said drive members engaging links of said inner chain to move the belt downstream along the path, wherein the improvement comprises each link in said inner chain extending from its respective rod upstream with respect to the direction of movement of the belt and around the adjacent upstream rod to define a link recess and to secure the adjacent rods together and thereby fix the pitch of the inner chain; the interior openings of the links of the outer chain having sufficient width and length along the path so that the rods float in such openings and are free for limited movement toward and away from each other so that the pitch of the outer chain is free to vary in response to change in the radius of curvature of the path, whereby drag forces exerted on the rods by said support bias the rods upstream with respect to the links of the inner chain and force the inner links against the link recesses of their respective upstream rods to lock the inner links together to support the rods without column loading of the rods.

* * * * *